(12) United States Patent
Hudson

(10) Patent No.: US 7,171,780 B1
(45) Date of Patent: Feb. 6, 2007

(54) SURFACE FOR THE GROWING OF TURF FORMING GRASSES AND OTHER PLANTS

(75) Inventor: Michael James Hudson, Goulburn (AU)

(73) Assignee: Stratum Green Pty Ltd., Sydney (AU)

( * ) Notice: Subject to any disclaimer, the term of this patent is extended or adjusted under 35 U.S.C. 154(b) by 0 days.

(21) Appl. No.: 10/399,697

(22) PCT Filed: Oct. 20, 2000

(86) PCT No.: PCT/AU00/01295

§ 371 (c)(1),
(2), (4) Date: Aug. 4, 2003

(87) PCT Pub. No.: WO02/34860

PCT Pub. Date: May 2, 2002

(51) Int. Cl.
*C09K 17/00* (2006.01)
*A63K 1/00* (2006.01)
*E01C 13/00* (2006.01)

(52) U.S. Cl. .................. 47/1.01 F; 47/59 S; 428/17

(58) Field of Classification Search ............. 47/1.01 F, 47/1.01 R, 59 S, 65.9; 428/17
See application file for complete search history.

(56) References Cited

U.S. PATENT DOCUMENTS

| | | | |
|---|---|---|---|
| 4,631,181 A | * | 12/1986 | Matsumoto et al. .......... 208/22 |
| 4,852,870 A | | 8/1989 | Hawkins et al. |
| 5,099,599 A | * | 3/1992 | Ellison ..................... 47/1.01 R |
| 5,112,655 A | * | 5/1992 | Larson et al. ............ 427/407.1 |
| 5,309,846 A | * | 5/1994 | Peterson .................... 108/53.3 |
| 5,414,029 A | | 5/1995 | Lemoine et al. |
| RE35,006 E | * | 8/1995 | Ripley et al. ................ 47/65.9 |

FOREIGN PATENT DOCUMENTS

| | | |
|---|---|---|
| AU | 712740 | 11/1999 |
| DE | 1972530 | 12/1997 |
| WO | WO 96/32174 | * 10/1996 |

* cited by examiner

*Primary Examiner*—Jeffrey L. Gellner
(74) *Attorney, Agent, or Firm*—Knobbe Martens, Olson & Bear LLP

(57) ABSTRACT

An artificial surface for the growing of turf forming grasses and other plants, comprising a mixture of rubber, a polymer modified bitumen emulsion and slow release, plant nutrient containing particles, mixed in sufficient proportions and to a substantially even distribution of each of the rubber, emulsion and particles throughout the mixture so that, when laid and cured, the mixture uniformly produces a water permeable, heat conductive surface having air pockets through which a root system of the turf forming grasses and other plants can penetrate, the plant nutrient containing particles being trapped within the surface for slow release of plant nutrient to the root system.

21 Claims, No Drawings

SURFACE FOR THE GROWING OF TURF FORMING GRASSES AND OTHER PLANTS

RELATED APPLICATIONS

This application is a national phase entry of the international application PCT/AU00/01295 in the United States

FIELD OF INVENTION

The present invention relates to an artificial surface for the growing of turf forming grasses and other plants and, in particular, to a rubber based surface that may be used to replace soil as the growth medium for turf.

BACKGROUND ART

Recent developments in modern turf construction have focussed on providing soil having freely draining sand and gravel profiles that allow grass grown thereon to serve as an all weather surface.

In order to achieve the desired level of permeability of such surfaces, the sand and gravel components of the soil must be precisely specified, and great care must be taken in the course of constructing the surface. As the sand and gravel components are derived from naturally occurring deposits, it is almost impossible to find deposits of these components that satisfy the required specification, and so costly and time consuming grading and washing processes are necessary to conform the naturally occurring deposits appropriately.

A further difficulty has arisen in sourcing of the naturally occurring deposits due to the high demand for sand and gravel over the last few hundred years in the building and civil engineering industries. This demand has normally been satisfied by sourcing naturally occurring deposits near to the major cities where the most demand arises. These deposits are becoming increasingly exhausted and the costs and delays associated with the transportation of these deposits from ever more distant pits and quarries are placing a burden on satisfying the demand cost effectively.

More recently, turf farming has developed as a sustainable form of intensive horticulture. Although turf farming may provide a more cost effective means of supplying turf, some variability in the nutrient and water supply to farmed turf can result because of local variations in the naturally sourced soil or other growth medium used. Also, the growth medium may serve as a source or carrier for disease causing organisms, and it is not unusual for farmed turf to experience an outbreak of disease.

In order to avoid the difficulties imposed by the requirements to grade and wash naturally occurring sand and gravel deposits and to transport them over long distances, and to better control nutrient and water supply and disease outbreaks in farmed turf, attention is now being focussed, particularly in the sports turf industry, on providing alternative, artificial turf growth surfaces which are derived from recycled products or replaceable resources but which have at least comparable or improved performance to soil having freely draining sand and gravel profiles.

Artificial surfaces for the growing of turf are still in their infancy, but some advances have been made in providing artificial surfaces that have excellent drainage capacity and good structural integrity to resist adverse weather conditions and physical damage, which features are ideally suited to support turf growth. Such features, for example, are provided by the artificial surface disclosed in Australian Patent No. 712,740 by the present inventor, the teachings of which are herein incorporated by reference. That artificial surface essentially comprises a cold mixture of rubber and a polymer modified bitumen emulsion, mixed in a proportion and laid under a controlled downward pressure sufficient to produce a water permeable and flexible surface facilitated by air pockets in the laid surface. Although not originally intended as a custom made surface to support turf growth, it has been found that the artificial surface of Australian Patent No. 712,740 will, to a minimal degree, support the growth of turf, albeit of indifferent quality. To achieve controllable and optimal turf growth on that surface requires further development and testing, a task that has been undertaken by the present inventor in arriving at the present invention.

It is an object of the present invention to overcome, or at least substantially ameliorate, the disadvantages and shortcomings of the prior art.

It is another object of the present invention to provide an artificial surface for the growing of turf forming grasses and other plants that allows root penetration and water drainage therethrough, as well as having good heat conductance for prolonging plant growth.

It is yet another object of the present invention to incorporate in the aforementioned artificial surface a plant nutrient source that allows slow release of the plant nutrient for growth of the turf forming grasses and other plants.

SUMMARY OF THE INVENTION

According to the present invention, there is provided an artificial surface for the growing of turf forming grasses and other plants, comprising a mixture of rubber, a polymer modified bitumen emulsion, and slow release, plant nutrient containing particles, mixed in sufficient proportions and to a substantially even distribution of each of the rubber, emulsion and particles throughout the mixture so that, when laid and cured, the mixture uniformly produces a water permeable, heat conductive surface having air pockets through which a root system of the turf forming grasses and other plants can penetrate, the plant nutrient containing particles being trapped within the surface for slow release of plant nutrient to the root system.

Preferably, the particles comprise water absorbing, slow release plant nutrient crystals.

According to another aspect of the present invention, there is provided a method for producing an artificial surface for the growing of turf forming grasses and other plants, comprising (i) mixing rubber, polymer modified bitumen emulsion, and slow release, plant nutrient containing particles in sufficient proportions and to a substantially even distribution of each of the rubber, emulsion and particles throughout the mixture so that, when laid and cured, the mixture uniformly produces a water permeable, heat conductive surface having air pockets through which a root system of the turf forming grasses and other plants can penetrate, (ii) laying the surface and allowing it to cure so as to produce the air pockets in the water permeable, heat conductive surface, the air pockets enabling the root system to penetrate therethrough, the plant nutrient containing particles being trapped within the surface for slow release of plant nutrient to the root system.

Preferably, the mixing is carried out at ambient temperature.

DESCRIPTION OF THE PREFERRED EMBODIMENT

In order that the invention may be more readily understood and put into practical effect, reference will be made to the accompanying Examples of methods for producing artificial surfaces and the surfaces produced thereby.

EXAMPLE 1

An artificial surface according to a first embodiment of the present invention is produced by firstly dry, cold mixing in a "PAVESET"™ mixing machine equipped with a calibrated continuous flow means (such as is used for road making) a combination of about 32.8% w/w recycled, reconstituted or new rubber with an average mesh size (according to accepted standards) of between about 7 and 16, about 32.8% w/w mineral aggregate (of stone size up to about 10 mm diameter) such as basalt, sand or crusher dust, about 4.0% w/w filler, such as cement dust and fly ash, about 2.6% w/w additive, such as chemical retardants that slow down the "breaking" of emulsions, and about 0.8% w/w or water absorbing, slow release plant nutrient crystals, such as fertilizers coated with sulphur or a polymer that breaks down when subjected to specific conditions of temperature, moisture and/or time. The filler may also include zeolite. In one embodiment, the mixture may further include a chemical retardant adapted to slow the process of flocculation and coalescence, the processes acting so as to coat the particular forms of the ingredients with the bituminous emulsion.

In the present Example, the source of plant nutrient used was that known by the trade mark TERRACOTTEM, which is an ideal plant nutrient source because it is relatively high in potassium, has organic water absorbent polymers which increase the capacity of the growth surface to retain and provide water and nutrient, has a starter component of soluble and slow release mineral and organic nutrients which play an important role during the initial growth phase of the plants, such as turf forming grasses, and are also active for many months thereafter, has a trace amount of growth stimulating agent which encourages extensive root development in the initial growth phase, and has a carrier material which allows for homogeneous distribution of the crystals.

After about 7 to 10 minutes of dry, cold mixing, a thorough blend is formed.

About 27.0% w/w of a generic brand of polymer modified bitumen emulsion in water is then added to the mixture until a flowable or workable consistency of the mixture is formed. The polymer may be ethyl vinyl acetate or SBS (styrene butadiene-styrene). The emulsion may contain up to about 17.5% w/w of residual binder, such as latex. Water is also a large component of the emulsion. Typical emulsions are those produced by SHELL™, MOBIL™, PIONEER™, and other corporations involved in marketing of polymer modified bitumen emulsions. The emulsion may, in one example, include butanol in the range of 5% to 15% by weight and may also comprise either a cationic or anionic emulsion. The emulsion is run through a MAGFLOW™ meter and is constantly monitored by the operator. The flow is calibrated to ensure that the emulsion sufficiently coats the rubber, aggregate and filler. Some adjustment in the amount of additive and water may be required to achieve the required workable consistency and to avoid premature "breaking" of the emulsion.

Although various mixing techniques may be employed, it is important to note that constant agitation is not necessary. A minimum of mechanical agitation is required to quickly coat the rubber, aggregate and filler with emulsion. Excessive mechanical agitation may prematurely "break" the emulsion or abrade the coating of emulsion from the rubber and aggregate. If the emulsion "breaks" prematurely, the resultant product fails to bond together adequately. For this reason, small concrete mixers and the like are not suitable for use as their lift blades rotate too quickly, and produce high shearing forces. Ideally, the mixing machine useful in the present invention should (i) operate its blades or augers at less than 10 rpm, (ii) have blades or augers which are as small as possible, (iii) have a mixture holding drum which is significantly greater in height than it is in diameter, and (iv) operate in as nearly a horizontal position as possible to avoid lifting, shearing and splashing the mixture. As well as premature "breaking" of the emulsion, excessive mechanical agitation can lead to frothing of the mixture and energy waste.

The mixing machine is operated at an ambient temperature of about 25° C., although mixing may be carried out at higher and lower temperatures if suitable adjustments are made to other mixing conditions and/or component concentrations.

When a workable consistency of the mixture is formed, it is fed out of the mixing machine at a flow rate of about 1.5 kg per second, being forced by the augers through a screed box at the rear of the mixing machine which is at a height and over a location of use suited for pouring the still molten mixture. The location in which the pour is to occur has a depth of about 100 mm and, depending on the drum volume capacity of the mixing machine, can cover a large area. The flow rate may be adjusted depending on the ambient temperature and other circumstances which might affect the level of workable consistency of the mixture.

As the mixture leaves the mixing machine in the form of a molten "slurry", it has a characteristic brown colour attributable to the polymer modified bitumen emulsion, and as the mixture "breaks" after being laid as a surface in its location of use, water is released by percolating through the surface and evaporating into the atmosphere. The "breaking" of emulsions is a commonly used reference in the art to a process known industrially as "flocculation and coalescence" of bitumen based emulsions, a process which is controlled by temperature, mechanical agitation, and the presence of any chemical retardants of the process. It is postulated that the "breaking" process involves a chemical reaction that coats irreversibly the inert particulate components of the mixture, namely the rubber, aggregate and filler used in the present Example, with the polymer modified bitumen emulsion, thereby bonding together the resultant surface. The "breaking" process leads to curing of the mixture, causing its colour to change from brown to black and its gradual loss of stickiness.

Curing is complete in about 30 to 40 minutes depending on the ambient temperature, and the surface is then, optionally, rolled into a mat of desired thickness and smoothness with the use of hydraulic vibrating and rolling machinery, which expels excess water and assists in the further bonding together of the resultant mat surface but does not cause compounding of the mat surface that would lead to loss of its desired properties.

Should the mat surface, or the surface which is not rolled into a mat as described above, be required to be of a particular level of hardness, adjustment of the concentration of rubber in the mixture can be made, with the higher the concentration of rubber, the softer the surface.

The surface constitutes a tightly gripped, water permeable, shock absorbing surface on the location of use, being a well drained, excavated location of ground where use of the surface for the growing of turf forming grasses and other plants is desired. As with the artificial surface disclosed in Australian Patent No. 712,740, the present artificial surface has air pockets that facilitate water permeability and flexibility.

The source of plant nutrient, which is in crystal form in the present Example, is stabily and accessibly trapped in the surface. The slow release of mineral and organic nutrients from the trapped nutrient source, coupled with the presence of air pockets critical for water permeation or percolation and drainage stimulates the development of root systems through the surface and the accompanying growth of the plants.

Turf grass, such as Kikuyu and Cynodon Dactylon (a variety of couch grass), which is pre-grown, in and sheared with, a minimum depth of soil, is then laid over the surface. With proper care, the grass takes root in the artificial surface and, subject to the weather conditions, the turf can be used as a weight bearing or heavy traffic surface or for some sports after about 14 days to about 25 days.

EXAMPLE 2

A slightly slower growing turf than that grown on the artificial surface of Example 1 may be produced on a better draining, more shock absorbing surface suitable for many sports by laying a loose overcushion of rubber shavings having a width in any direction of between about 20 mm and 80 mm so that the overcushion is to a depth of about 50 mm to 100 mm over the artificial surface of Example 1. Randomly mixed in with, or sprinkled over, the overcushion is a quantity of the plant nutrient crystals used in the artificial surface of Example 1. The thickness of the overcushion of rubber shavings and plant nutrient crystals is no more than about 200 mm. Specialized sports turf grass is then laid over the surface. The grass takes root in the surface by developing root systems through both the overcushion and the surface of Example 1 acting as a base for the overcushion, and the surface can be used after about 30 days under normal weather conditions, but after about 14 days if the weather and other conditions are optimal.

The base and the overcushion, both being coloured black, readily absorb sunlight which is converted into heat. Although some of the heat energy is radiated into the atmosphere, much of it is conducted through the base and overcushion causing a warming of the surface that promotes root penetration and the development of branching root systems throughout the surface, leading of course to faster turf growth and repair should the turf become damaged.

A similar benefit in the growth and repair of turf grass arising from the surface warming effect is provided by the artificial surface of Example 1.

When established, the turf grown on the artificial surface of the invention is maintained in a similar manner to turf grown on naturally occurring surfaces, but with the advantage that water and nutrient may be more efficiently used in promoting growth.

A typical composition of the artificial surface produced in Example 2, over an area of 150 m² at a depth of 100 mm, to be covered by the same area of turf, is a follows:

| | |
|---|---|
| Rubber | 4 tonnes |
| Aggregate | 29.34 tonnes |
| Filler | 313 kgs |
| Emulsion | 2500 liters approx. (2.54 tonnes approx) |
| Plant Nutrient Crystals | 15 kgs |
| Overcushion | 1 tonne |
| Polymer Residual* | 8% w/w |

*Polymer Residual is a reference to the proportion of polymer in the polymer modified bitumen emulsion.

EXAMPLE 3

A turf that may be used within an hour of being laid can be produced by laying mature turf onto the still uncured or sticky mixture that has been poured into its location of use, as described in Example 1. A turf tractor equipped with a roller apparatus unrolls the turf onto the sticky mixture and the underside of the turf through which the root systems emerge are bonded to the sticky mixture. With curing of the mixture, the turf is established and can be used immediately in most circumstances.

EXAMPLE 4

The artificial surface of the present invention can be adapted for stockpile production that will allow for immediate transportation of a large number of interconnectable, fully developed turf bearing surfaces as may be required in high wear and tear locations. Such turf bearing surfaces can be readily stored for long periods under appropriate conditions and then transported rapidly to locations requiring immediate replacement of the existing turf surface.

Such an artificial surface may be prepared from a "slurry" or mixture having the composition, and in a manner, described in Example 1, but with a slight percentage w/w increase in the concentration of rubber to permit better shock absorbing capability and drainage. The "slurry" is screed out from the mixing machine and into specially formed, uniform, rectangular trays to a depth of 100 mm. The trays themselves are 2.4 m in length and 1.2 m in breadth, and have a depth of 150 mm, and may be made of steel, polypropylene or other plastic. The trays may have a false bottom, preferably of a recycled cardboard which will be disposed of after curing and hardening, and may have detachable sliding sides, with a strengthening mesh centre piece approximately 60 mm from the base above ground level. Struts are positioned down the middle of the tray for tensile strength and secret lugs are placed on corners for transport that can be recessed when the tray is placed into working position. A bottom can replace the recycled cardboard after the mixture is cured and prior to transportation. This particular bottom will have weep holes in place for drainage. When the "slurry" is screeded to a height inside the tray of 100 mm, and has not begun to "break", as emulsions do, specialized mature sports turf is laid onto the still wet and sticky surface with slight downward force. The turf automatically bonds with the wet surface and, when the curing process is complete, the turf is in situ and the root system is fully established. This means that the trays are ready for market within about 40 minutes of manufacture. The weight of the finished tray with turf installed is approximately 180 kilograms and can easily be transported and placed on site with a standard hydraulic crane attached to a truck. This form of manufacture can also be varied to include a soft overcushion of loose material prior to the keying in of the specialized sports turf. The amount of plant nutrient crystals in these trays is approximately 200 grams per tray.

EXAMPLE 5

The method used in Example 4 is followed, but in this Example, turf is placed in the tray on a false grid 50 mm below the top of the tray. Roots of the turf plants are then teased down to the base of the tray and the "slurry" is poured or pumped into the tray. This consolidates the roots and in fact uses the roots as part of the bonding system which adds strength and durability to the artificial surface.

EXAMPLE 6

The artificial surface of the present invention can be used to grow plants other than turf forming grasses, such as fruit bearing plants and other agricultural crops. When trialed, the artificial surfaces produced according to Examples 1 to 5 all successfully supported the growth of established crops, which were keyed into the wet and sticky surface in the manner described in Example 4 and Example 5. One benefit of the artificial surface of the present invention for the growing of agricultural crops is that it seals contaminated soils and provides a basis for new crop growth. In an alternative approach, the established crops were keyed into an overcushion of a surface as hereinbefore described. In a further alternative, an overcushion of soil is used to allow seeding and subsequent germination of crops.

EXAMPLE 7

The artificial surface of the present invention can be used to grow nursery plants and seedlings, such as those normally grown in small pots or in punnets, like flowering plants and fruit bearing plants. When trialed, the artificial surface of Example 1 successfully supported the growth of seedlings which were laid onto the still uncured or sticky mixture that was poured into a pot. The amount of water absorbing, slow release plant nutrient crystals in the mixture will vary according to the size of the pot to be filled, but is normally in the range of 80 to 100 grams/m$^2$ of surface.

EXAMPLE 8

A number of different kinds of water absorbing, slow release plant nutrient crystals (also known in the art as slow release fertilizers) were used in turf growing trials with the artificial surface of the present invention. When TERRA-COTTEM™ slow release fertiliser was used at a rate ranging from 80 g/m$^2$ to 135 g/m$^2$, successful growth characteristics were achieved over a period of 12 months, and it is expected that similar characteristics will persist for a further 4 years.

Successful growth characteristics are defined as:

(a) the promotion of health plant and root growth, (b) an increase in the size of the grass under controlled conditions, and (c) an increase in the speed of growth.

These are direct comparisons drawn against a standard, soil based, equivalent substrate.

EXAMPLE 9

We trialed several common brand turf fertilizers for use in the artificial surface of the present invention. Successful growth characteristics resulted with surfaces that incorporated either sulphur coated or polymer coated slow release fertilisers. Common brand turf fertilisers trialed include Osmocote™, Scotts Turf Supreme™ and Best Turf Gold™. The most successful growth characteristics came from using the Best Turf Gold™ fertilizer having a sulphur coated N:P:K:S formulation of 22:5:8:9.

EXAMPLE 10

Several organic and non organic liquid fertilizers were tested with turf growing on the artificial surface of the present invention. Most proved to be very successful, especially if used in conjunction with liquid seaweed, such as Natrakelp™. Our observations conclude that to optimise successful growth characteristics, such liquid fertilizers should be applied every 4 weeks at a rate of 5 ml/m$^2$ in conjunction with 10 ml/m$^2$ formula of N:P:K: being in a ratio of 10:10:29 every month during the plant's growing season.

In general, the artificial surface of the present invention has numerous advantages, such as:
Readily accessible and trapped source of nutrient
Light absorbing and heat conductive to facilitate and prolong growth over colder months.
Can be manufactured and laid under a variety of climatic conditions.
Suitable for many different applications.
Non flammable.
Non toxic, non hazardous and environmentally compatible.
High level drainage.
True all weather surface.
High stress absorption.
High post yield resistance.
Superior anti strip properties.
High tensile strength.
High resistance to temperature extremes.
High resistance to ultra violet radiation and oxidation.
Low maintenance, easily repaired if damaged.
Longevity.
The high quantities of recycled rubber used in the manufacture process.
A concussion absorbing product making it a safer surface for sport, recreation and leisure.
Sound absorbing.
Can be made to suit a number of climates.
Has air pockets which allow drainage, shock absorbing capabilities and root penetration.
Resistant or inert to grub and insect attack.

Various modifications may be made in details of design and construction without departing from the scope and ambit of the invention.

What is claimed is:

1. A system for the storage and subsequent installation of segments of turf, said segments prepared with a first lower layer comprised of a resilient, water permeable mixture when cured, said mixture including:
   (a) an elastomeric polymer,
   (b) water,
   (c) bituminous emulsion,
   (d) mineral aggregate,
   (e) filler, and (f) slow release plant nutrient crystals wherein the slow release plant nutrient crystals are deposited in the mixture so as to be distributed through the mixture and trapped within the mixture once the mixture has cured, and a second upper layer comprised of grass supported in a soil matrix wherein the grass grows into the first lower layer.

2. The system of claim 1 wherein said elastomeric polymer is one or more selected from a set of polymers, said set including natural rubber, provided in particulate form.

3. The system of claim 2 wherein said emulsion is a cationic emulsion.

4. The system of claim 2 wherein said emulsion is an anionic emulsion.

5. The system of claim 1 wherein said bituminous emulsion is polymer modified.

6. The system of claim 5 wherein said emulsion includes butanol in the range 5 to 15% by weight.

7. The system of claim 5 wherein said polymer is one or more selected from a set of polymers, said set including ethyl vinyl acetate and styrene butadiene-styrene (SBS).

8. The system of claim 1 wherein said mineral aggregate is one or more selected from a set of aggregates in particulate form, said set including basalt, sand, and crusher dust.

9. The system of claim 1 wherein said filler is one or more selected from a set of fillers in particulate form, said set including cement dust and fly-ash.

10. The system of claim 9 wherein said filler includes zeolite.

11. The system of claim 9 wherein said filler includes bottom ash.

12. The system of claim 1 wherein said mixture further includes a chemical retardant adapted to slow the processes of flocculation and coalescence, said processes acting so as to coat said particulate forms of said ingredients with said bituminous emulsion.

13. The system of claim 1 wherein the resilience of said resilient surface is a function of the proportion of elastomeric polymer included in said mixture, higher proportions conferring greater resilience to said surface.

14. The system of claim 1 wherein the average mesh size of said particulate form of said elastomeric polymer is in the range of 7 to 16.

15. The system of claim 1 wherein the size of said particulate form of said aggregate is in the range of 5 to 10 mm in diameter.

16. The system of claim 1 wherein said elastomeric polymer comprises between 25 and 40% of said mixture by weight.

17. The system of claim 1 wherein said bituminous emulsion comprises between 20 and 35% of said mixture by weight.

18. The system of claim 1 wherein said aggregates comprises between 20 and 45% of said mixture by weight.

19. The system of claim 1 wherein said ingredient of aggregates comprises between 25 and 40% of said mixture by weight.

20. The system of claim 1 wherein said ingredient of filler comprises between 2 and 6% of said mixture by weight.

21. A system for the provision of a covering-over of an area of suitably prepared surface with interconnecting segments of resilient turf, said system adapted for the temporary provision of a sport playing surface and wherein said supporting trays are prepared with a first lower layer comprised of a resilient, water permeable mixture when cured, said mixture including:
(a) an elastomeric polymer,
(b) water,
(c) bituminous emulsion,
(d) mineral aggregate,
(e) filler,
(f) slow release plant nutrient crystals wherein the slow release plant nutrient crystals are deposited in the mixture so as to be distributed through the mixture and trapped therein at time of manufacture, and a second upper layer comprised of grass supported in a soil matrix wherein the grass grows into the first lower layer.

* * * * *